United States Patent [19]

Mielke

[11] 4,168,896
[45] Sep. 25, 1979

[54] ROLL FILM CAMERA FOR CARTRIDGES HAVING A SINGLE MODE-CHANGING CONTROL OPERABLE FROM THE CARTRIDGE EXTERIOR

[75] Inventor: Bodo Mielke, Wolfenbuttel, Fed. Rep. of Germany

[73] Assignee: Rollei-Werke Franke & Heidecke, Braunschweig, Fed. Rep. of Germany

[21] Appl. No.: 827,842

[22] Filed: Aug. 26, 1977

[30] Foreign Application Priority Data

Sep. 9, 1976 [DE] Fed. Rep. of Germany ....... 2640517

[51] Int. Cl.² .............................................. G03B 17/26
[52] U.S. Cl. .................................... 354/275; 354/203; 354/209
[58] Field of Search ............... 354/203, 209, 212, 213, 354/216, 275, 281, 283

[56] References Cited

U.S. PATENT DOCUMENTS

| | | | |
|---|---|---|---|
| 3,460,730 | 8/1969 | Krumbein | 226/64 |
| 3,470,803 | 10/1969 | Fukuoka et al. | 354/173 |
| 3,511,153 | 5/1970 | Steisslinger et al. | 354/213 |
| 3,532,041 | 10/1970 | Prochnow | 354/212 |
| 3,574,296 | 4/1971 | Prochnow et al. | 354/288 |
| 3,628,432 | 12/1971 | Ettischer | 354/213 |

*Primary Examiner*—John Gonzales
*Attorney, Agent, or Firm*—Ernest F. Marmorek

[57] ABSTRACT

In a roll film camera, using a cartridge, an alternately actuatable slider-locking and cartridge-latching mechanism, a film-gate adjustment device for releasably pressing against a film gate, and a coupling mechanism operative for activating, and, respectively, inactivating the camera feeding mechanism, are operatively connected to a common mode-changing control operable from the cartridge exterior.

7 Claims, 6 Drawing Figures

ROLL FILM CAMERA FOR CARTRIDGES HAVING A SINGLE MODE-CHANGING CONTROL OPERABLE FROM THE CARTRIDGE EXTERIOR

BACKGROUND OF THE INVENTION

The invention relates to a roll film camera using exchangeable cartridges, particularly a miniature camera having an electric motor drive.

In the prior art full-proof operation of a camera has been obtained by a series of alternately acting locks; an operator, particularly an amateur, will therefore know that controls must be operated in a predetermined sequence. This does, however, easily lead to errors. Thus, if the operator is in a hurry, or uses force to overcome such locks, this in turn leads to the destruction of certain camera parts.

SUMMARY OF THE INVENTION

It is therefore one of the principal objects of the present invention to greatly simplify the handling of the camera, particularly as far as the change of cartridges is concerned, so that only a single control or knob needs to be operated, in addition to withdrawing and inserting the cartridge.

The present invention aims to confine the attention of the amateur operator only to the latching and unlatching operation for the cartridge, and the opening and closing of the cartridge slider, as only a single control knob is required to operate the camera. It is a feature of the present construction, that the film is stored in the cartridge in a practically unstressed state, when the cartridge has been unlatched from the camera; furthermore, by appropriately operating coupling means operative for activating and, respectively, inactivating the cartridge feeding means, multiple exposures can be obtained by operating the same control knobs without any special devices being required.

Accordingly, a multiple mode roll film camera, particularly a miniature camera having an electric drive, includes in combination a cartridge insertable into the camera, the cartridge being adapted to hold a film, a film gate disposed in the cartridge, a slider movable within the cartridge between a first position covering the film gate and a second position remote from the film gate, locking means operable for locking the slider in the first position, latching means operative for latching the cartridge in position in the camera, the locking and latching means being alternately actuatable, film gate adjustment means operable for releasably pressing against the film gate, film feeding means operable for advancing the film of the cartridge, coupling means operative for activating and, respectively, inactivating, the feeding means, and rotatable mode-changing means disposed in the cartridge operable from the cartridge exterior for selectively actuating the locking and latching means, the film gate adjustment means, and the coupling means, respectively.

It is preferable if the mode-changing means include cam means and cam-follower means movably mounted in the cartridge; the cam-follower means are in operative contact with the cam means; the alternately actuatable locking and latching means, the film-gate adjustment means, and the coupling means are connected to the cam means through the cam-follower means.

The mode-changing means preferably has a first position for latching the cartridge to the camera, and a second position for unlatching the cartridge from the camera, and the slider locking means has an open position corresponding to the first position, and a closed position corresponding to the second position; the mode-changing means include cam and cam-follower means including a first cam, for actuation of the slider locking means, and the cam-follower means include a lever for sensing the position of the slider locking means. The lever is non-operative when the mode-changing means is in the second position, and serves to operatively lock the first cam when the mode-changing means is in the first position, and the slider locking means is in the open position, so as to prevent unlatching of the cartridge latching means from the camera.

The cam-follower means preferably includes a second lever operatively coupled to the film-gate adjustment means, having a curved end, and the cam means preferably include a roller eccentrically disposed thereon. Spring means are preferably secured to the film-gate adjustment means for urging the second lever to be in contact with the curved end. The camera preferably includes yieldably resilient means, such as a spring, disposed in the housing for urging the cam means to move in the direction opposite to the predetermined direction; the cam means has indentations for the cam-follower means to fit thereinto in respective ones of the positions.

The cam means preferably includes a second cam for control of the film-gate adjustment means, and the mode-changing means is preferably rotatable in a predetermined direction when moving from the first position to the second position; it additionally has a third position disposed beyond the second position in a direction opposite to the predetermined direction, so that the film-gate adjustment is actuated when the mode-changing means is rotated in the direction opposite to the predetermined direction, and the coupling means is actuated when the mode-changing means is disposed in the third position.

The camera defines an optical axis, and the mode-changing means has preferably an initial non-operative position intermediate between the first and second positions; the film-gate adjustment means may be moved between third and fourth positions in third and fourth predetermined directions, respectively, opposite to one another, the third and fourth predetermined directions being substantially parallel with the optical axis.

BRIEF DESCRIPTION OF THE DRAWING

For a fuller understanding of the nature and objects of the present invention, reference should be had to the following detailed description, taken in conjunction with the accompanying drawing, in which.

DESCRIPTION OF THE PREFERRED EMBODIMENTS

Figure 1:
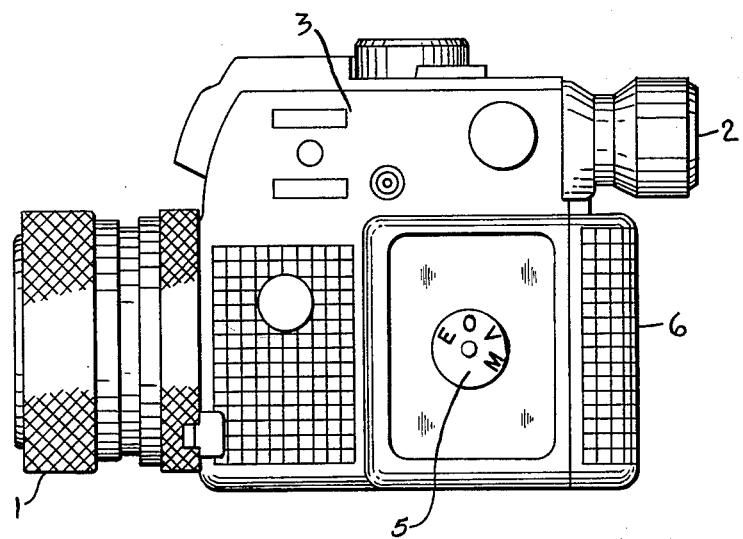
FIG. 1 is a side view of the camera.
Figure 2:
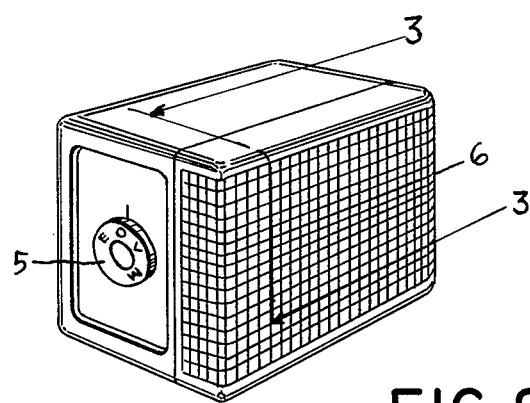
FIG. 2 is a perspective view of the cartridge whenunlatched from the camera as viewed from the bottom

In carrying the invention into effect, the camera shown in the drawing is a single-lens mirror reflex camera, in which the view finder is disposed in a position substantially parallel to the optical axis of a lens 1, so that the image can be viewed from above the camera through an eye-piece 2. The camera housing 3 is cube-shaped, and the rear part of the housing 3 is formed by a roll film cartridge 6, which fits the contour of the camera. On the bottom of the camera there is disposed a control knob which may be moved to four positions, namely an initial position, referred to as "O", an unlatched position "E" shown to the left, or counter-clockwise from the initial position "O" as seen in FIG. 2, a latching position "V" disposed to the right, or clockwise from the initial position "O", namely a position where the film guidance is operative, and an operative drive position "M" shown still further clockwise from the latching position "V" for drive of the cartridge 6 by a motor. The bottom or floor of the cartridge 4 may be opened for the purpose of changing the film, and on its front side, namely the side facing the lens, there is disposed a guidance for the cartridge slider, as can be seen from FIG. 3.

Figure 3:
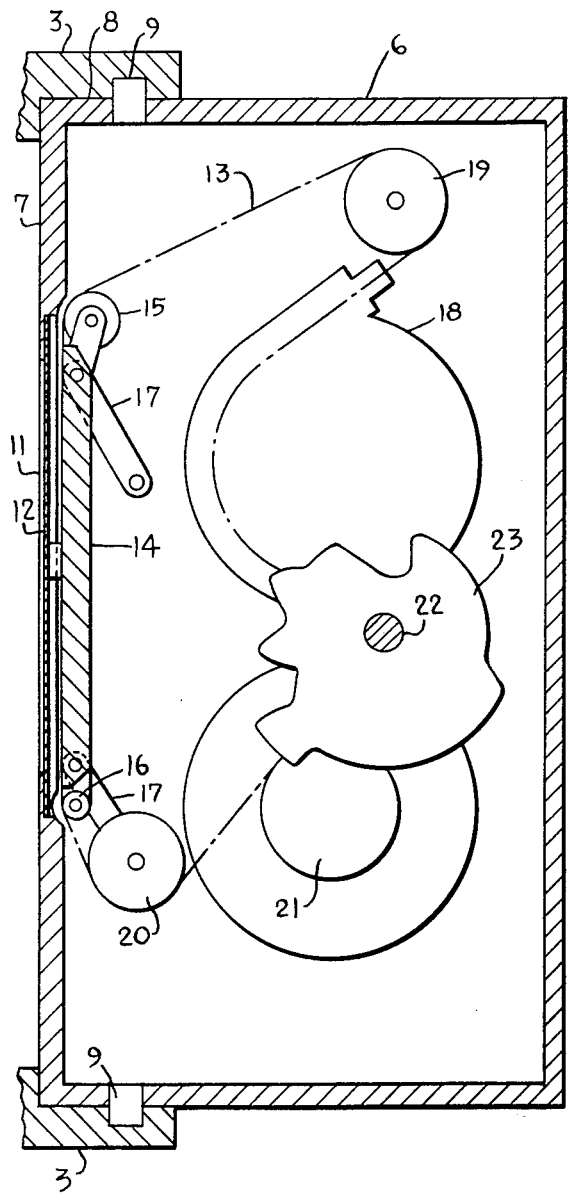
FIG. 3 is a cross-section of the cartridge along line 3—3 of FIG. 2 in a plane parallel to its bottom

FIG. 3 is a cross-section along the line 3—3 of FIG. 2. The cartridge 6 fits with its front end 7 into corresponding recesses 8 of the camera housing. In the front end 7 of the cartridge 6, there occurs an opening 11, which may be manually closed by a slider 12, the slider 12 being shown dotted in the open position in FIG. 2. A film 13 is transported over the movable film-gate adjustment means or pressure plate 14. Film-guide- or deflection - rollers 15 and 16 are disposed on opposite ends of the pressure plate 14. The pressure plate 14 is, for example, movably supported in the cartridge 6 on arms 17 and 18 of a parallelogram. The film 13 is discharged from the supply reel 18, and passes via a rerouting roll 19 over a first deflection roll 15, the pressure plate 14, over a second deflection roll 16, and then via a control roll 20 to the take-up reel 21. The control roll 20 may, for example, be driven through a releasable coupling or clutch, which projects from the cartridge 6, and which meshes with a corresponding coupling, if the cartridge has been appropriately inserted into the camera; this type of driving mechanism is well known. Between the supply reel 18 and the take-up reel 21, there is disposed a shaft 22, having a cam 23, the function of which may be ascertained from FIG. 4. The shaft 22 is also the shaft of the aforesaid control knob 5. The position of the cam 23, or its parts, corresponds to the initial position "O" of the control knob 5, namely its position immediately after the cartridge 6 has been inserted and latched, or locked to the camera, which is accomplished by the lever ends 24 nestling within respective recesses 9 of the camera housing 3. The lever ends 24 are ends of double-acting levers 25, respectively which, in turn, have feeler ends 26 which may be made to slide on the cam 23. A dual lever 27, which is pivotable around a pin 28, is disposed with one end 29 thereof within the region of a sensing member 30 of the cartridge slider 12.

Figure 4:
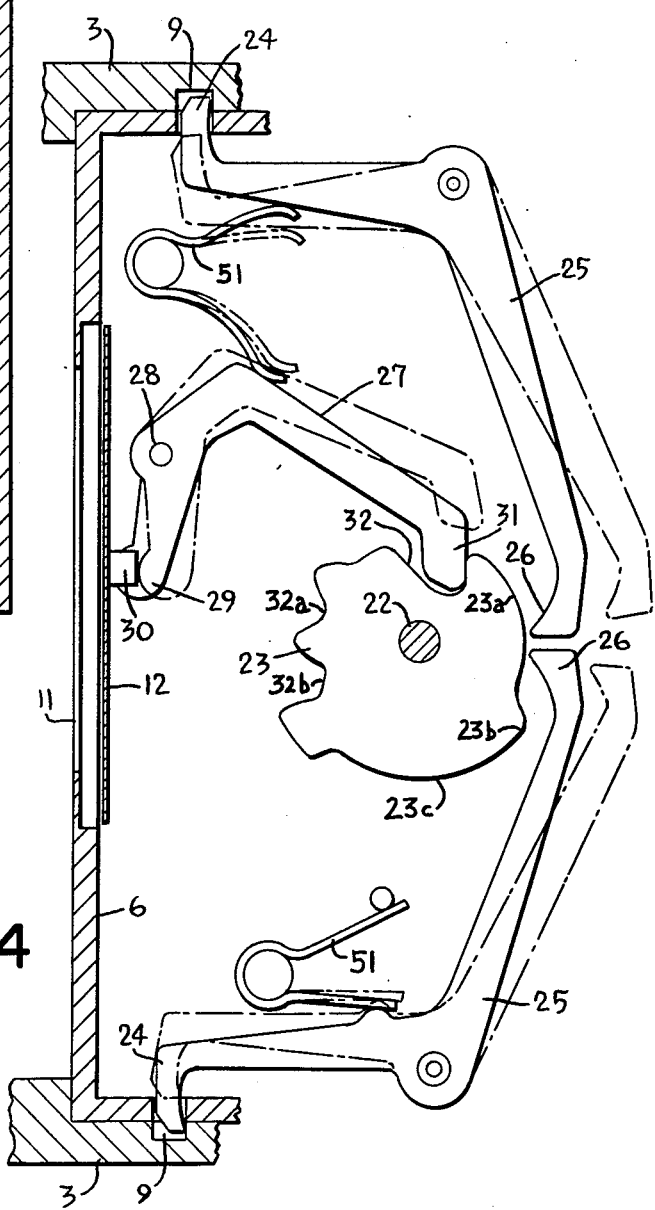
FIG. 4 shows the mechanism for the first cam.

In FIG. 4, the cartridge slider 12 cooperates via a sensing member 30, and a lever 27, 29, with the cam 23. The lever 27 assumes the position shown in full lines, in the case of an open cartridge slider 12, to the extent that the cam 23 permits the insertion of the end portion 31 of the lever 27, 29 into the recess 32 of the cam 23; this is the case in the basic or initial position of the cam 23, namely the position "O" of the knob 5, rigidly connected to the cam 23. The shape of the recess 32 permits, in the case of an open cartridge slider 12, a rotation of the cam 23 connected to the shaft 22, or to the control knob 5, into the positions "V" or "M", only in a clockwise sense from the position "O", but where the lever end portion 31 engages either the recess 32a or the recess 32b of the can 23, a rotation in a counter-clockwise from the position "M", via the position "V", to the position "O" is possible. (FIG. 4). When the cartridge slider is closed, the lever 27 is brought into the position shown dotted, in which dotted position the cam 23 is released for rotation in both directions by the end portion 31 of the lever 27, 29, the recesses 32a and 32b, though, still remaining operative.

The levers 25, 26 are actuated by a rotation of the cam 23, whose end portions 24 are urged to move towards the exterior by springs, and thus permit the locking of the cartridge to the camera. The portions 23a, 23b, and 23c of the cam 23 are so arranged, that the end portions of the lever 26 are lifted from the initial position "O" (FIG. 4), to the position "E" of the adjusting knob 5, when the cam 23 is rotated in a counter-clockwise sense, so that the locking ends 24 of the levers 25 of the cartridge are disengaged from the locking recess 9 in the camera housing 3. As the levers 25 are urged towards the cam 23 by respective springs 51, the knob 5 need not be actuated, when the cartridge is inserted into the camera, in order to lock the cartridge thereinto, provided the locking ends 24 are appropriately recessed, so that they snap automatically into the housing 3, when the cartridge is inserted.

Figure 5:
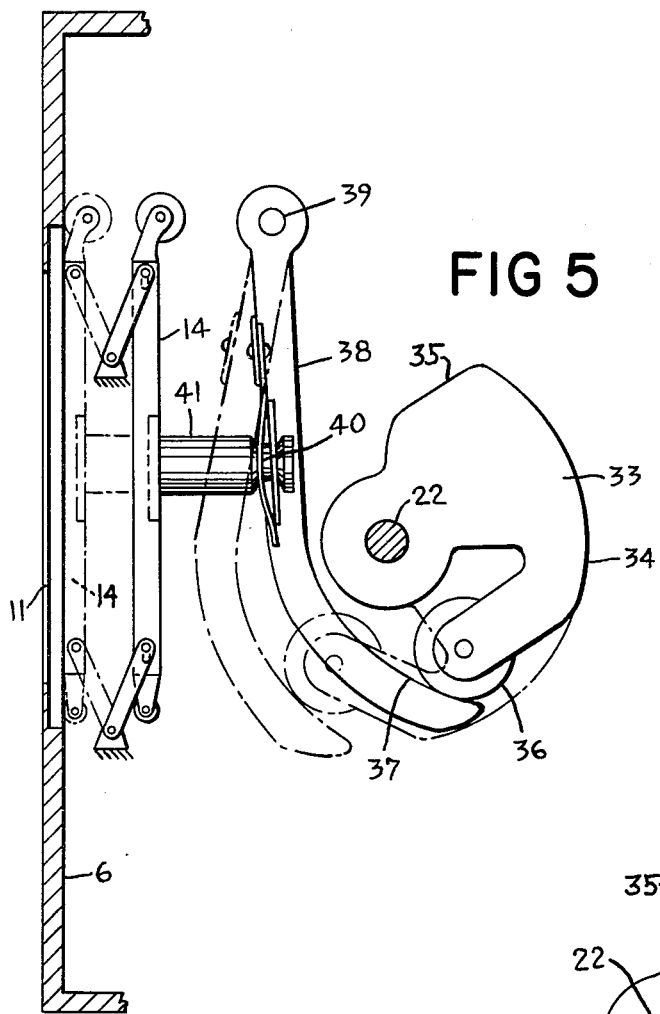
FIG. 5 shows the mechanism for the second cam.
Figure 6:
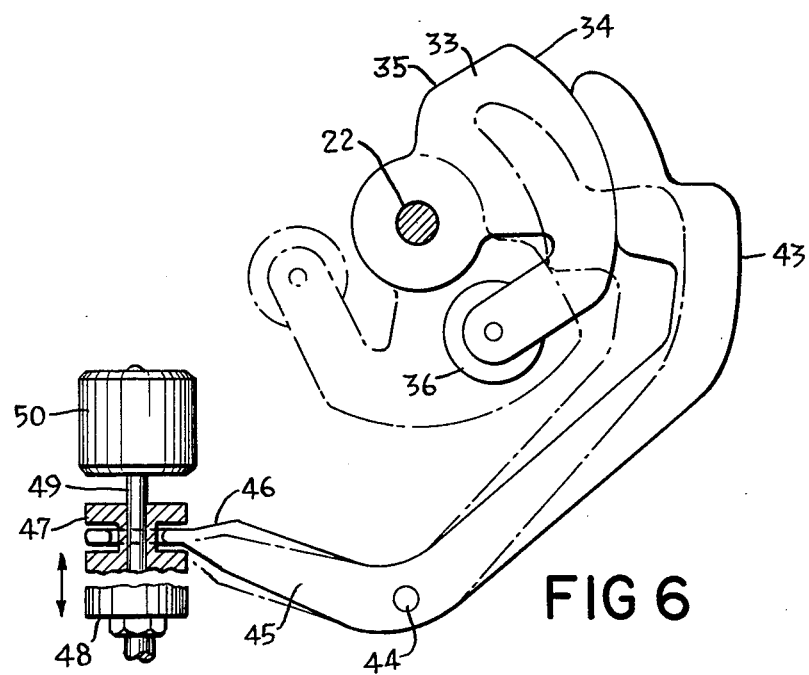
FIG. 6 shows the cam of FIG. 5, as well as the coupling to the film feeding means.

As can be seen from FIG. 5, the shaft 22 is provided with an additional cam 33' having a roller 36, which cooperates with a curved end 37 of a lever 38, which in turn is pivotable around a pin 39. A leaf spring 40 disposed in the center region of the lever 38 surrounds a pin 41 having appropriate recesses, the pin 41 being connected to the film-gate pressure plate 14. It will be understood that the cams are disposed on one side in the cartridge 6, and that, correspondingly, the levers, and if necessary the shafts, in this case the shaft 39, passes through the cartridge 6, so that the pins 41 are disposed on both sides of the film-gate, and that the levers 38 correspondingly project towards the center of the mechanism. Only one of the levers 38' includes the curved portion 37. When the cam 33 is rotated in a clockwise direction, the roller 36 slides on the curved surface 37 of the lever 38, so as to pivot the lever 38' towards the left, or clockwise, as shown in FIG. 5, and therefore presses the pressure plate 14 via the spring onto the film-gate. The image window guide 14 is then closed in the positions "V", and "M" of the control knob 5, but is open in its other positions "O" and "E". The curved portion 34 of the cam 33 has an additional task or objective, which can be ascertained from FIG. 6. The cam 33 and its radial edge 35 cooperate with a dual-arm lever 43, which is pivotable about a pin 44, the lever 43 projecting with its other end 45 into the region of the control roller 20, (FIG. 3) and is formed with a sloping end 46, by means of which the clutch or coupling of the film drive 49, 50 can be engaged or disengaged. The second cam 33, 34 (see FIGS. 5 and 6) thus controls the coupling of the film drive 49, 50 on the side of the camera to the film drive on the side of the cartridge, or of the film reel 48. This mechanism is arranged, so that the coupling 47, 48 is effective only in the end position "M" of the control knob 5, or of the shaft 22. As can be seen from FIG. 5, the position of the lever 38 no longer changes when acted upon by the roller 36 during the final portion of rotation of the cam 33, and this portion is the segment in which the lever ends 43 and 45 are activated, namely pivoted so as to engage the coupling or clutch.

This mechanism can therefore be driven so that, in order to obtain multiple exposures, the shaft 22 or the control knob 5 is set from the position M (Motor Drive) to the position V (Advance of the Pressure Plate). Thus the drive is decoupled, and although the next exposure results in a rewinding of the shutter through the motor, the film is not transported any further. By leaving the control knob 5 in this position, a whole series of multiple exposures can be obtained, as desired for a particular case. By this central control, and mutual independence of the drive parts, it is possible to use the locking lever 27, as an arresting lever for the control knob positions "O", "V", and "M", or make a simple double exposure possible in the position "V", in which the image window guide 14 is closed, but the film drive is released.

Having thus described the invention, what I claim as new and desire to be secured by Letters Patent, is as follows:

1. A multiple-mode roll film camera, particularly a miniature camera having an electric drive, comprising in combination:
    a cartridge insertable into the camera, said cartridge being adapted to hold a film, and being provided with an opening,
    a film gate disposed in said, camera,
    a slider movable within said cartridge, between a first position covering said opening and a second position, uncovering said opening,
    locking means operable for locking said slider in said first position,
    latching means operative for latching said cartridge in position in said camera, said locking and latching means being alternately actuatable,
    film gate adjustment means operable for releasably pressing against said film gate,
    film feeding means operable for advancing the film of the cartridge,
    coupling means operative for activating, and, respectively, inactivating said feeding means, and rotatable mode changing means disposed in said cartridge, and operable from the cartridge exterior for selectively actuating said locking and latching means, said film gate adjustment means and said coupling means, respectively.

2. A roll film camera according to claim 1, wherein said mode-changing means include cam means and further comprising cam-follower means in operative contact with said cam means, said alternately actuatable locking and latching means, said film gate adjustment means, and said coupling means being selectively connectable to said cam means through said cam-follower means.

3. A roll film camera according to claim 1, wherein said mode-changing means has a first position for latching the cartridge to the camera, and a second position for unlatching the cartridge from the camera, and wherein said slider locking means has an open position corresponding to said first position, and a closed position corresponding to said second position, and said mode-changing means include cam-and cam-follower means comprising a first cam for actuation of the slider locking means, and wherein said cam-follower means include a lever for sensing the position of said slider, said lever being non-operative when said mode-changing means is in said second position, and serving to make operative contact with said first cam when said mode-changing means is in said first position, and said slider locking means is in said open position, so as to prevent unlatching of the cartridge from the camera.

4. A roll film camera according to claim 3, wherein said cam-follower means include a second lever operatively coupled to said film gate adjustment means and having a curved end, said cam means including a roller eccentrically disposed on said cam means, and further comprising spring means secured to said film gate adjustment means for urging said second lever to be in contact with said curved end.

5. A roll film camera according to claim 2, further comprising yieldably resilient means for urging said cam-follower means to make contact with said cam means, and wherein said cam means has indentations for said cam-follower means to fit thereinto in respective ones of said positions.

6. A roll film camera according to claim 3, wherein said cam means includes a second cam for control of said film-gate adjustment means, and wherein said mode-changing means is rotatable in a predetermined direction when moving from said first position to said second position, and has a third position disposed beyond said first position in a direction opposite to said predetermined direction, whereby said film-gate adjustment means is actuated when said mode-changing means is rotated in said direction opposite to said predetermined direction, upon said slider having been moved to said first position, and said coupling means is actuated when said mode-changing means is disposed in said third position.

7. A roll film camera according to claim 6, the camera defining an optical axis, and wherein the mode-changing means has an initial non-operative position intermediate between said first and second positions, said lever serving to operatively restrain said first cam from moving to said second position when said mode-changing means is in said initial position, and wherein said film gate adjustment means are movable between first and second positions in first and second prearranged directions, respectively, opposite to one another, said first and second prearranged directions being substantially parallel with the optical axis.

* * * * *